Patented Oct. 9, 1945

2,386,716

UNITED STATES PATENT OFFICE 2,386,716

METHOD FOR RECOVERING BILE PIGMENTS

Jules D. Porsche and Fred J. Solms, Chicago, Ill., assignors to Armour and Company, Chicago, Ill., a corporation of Illinois No Drawing. Application June 1, 1940, Serial No. 338,432

7 Claims. (Cl. 260—314)

This invention relates to processes of preparing bile pigments and more particularly to processes for recovering bile pigments from natural products containing them.

Bilirubin, biliverdin, biliprasin and the like are found in various natural products such as bile, gall stones, meconium and the like. The problem of recovering such pigments or coloring matter from these starting materials has occasioned a great deal of investigation by prior workers in this field. These pigments do not occur free in their natural medium but are apparently present as complexes of some sort from which they have not hitherto been easily freed and recovered. It is well known that bile pigments combine in some manner with proteins or with breakdown products of proteins such as amino acids, as well as with other types of compounds present in the animal body. The complexes so formed are extremely stable and it has been a problem of long standing to develop a method for recovering the bile pigment without substantial destruction of the desired pigment.

Various solutions of this problem have been proposed in the past. In some cases the bile pigment, such as bilirubin, has been converted to an insoluble calcium salt in order to remove it from its natural medium and it has then been recovered from this salt by acidification, extraction and purification. In another manner of operation the starting material, bile, for instance, has been allowed to stand and age for long periods of time, even up to six months, in order to convert the pigments to a form in which it may be extracted from the bile with suitable solvents. In this aging process the material putrefies and gives rise to extremely unpleasant odors. In addition to this, the yield is decreased, evidently because some of the pigment is attacked and broken down by the organisms which develop during this process.

We have now discovered a method of freeing the bile pigments as described above from the natural complexes containing them by subjecting the materials, such as bile and gallstones, which contain the complexes to elevated temperatures in the presence of water, and recovering the bile pigments from the resulting solution. The water which is present in the heating operation may be the moisture naturally present in the starting material or it may be added water. We have found that heating these materials in an aqueous medium liberates the bile pigment, probably by causing a cleavage or a hydrolysis of the complex in which it is bound. The bile pigments, so liberated, are then recovered in any desired manner. They may be precipitated as insoluble salts with a suitable reagent such as calcium hydroxide. Alternatively, they may be recovered by extraction with a water-immiscible organic solvent.

An advantage of our process of treating bile pigment-containing complexes by subjecting them to elevated temperatures in the presence of water is that substantially all of the bile pigment present is quickly made available for extraction. Heretofore the yield of extractible bile pigment has not approached the total content of said bile pigment in the starting material and our proposed process gives a much improved yield and also a product of high purity.

In the case of bile we can operate by boiling the bile for a suitable time, for example, for about forty-five minutes to an hour. Lower temperatures than boiling temperature will also act to further the cleavage or hydrolysis of the natural complexes but somewhat longer reaction times will be required. For example, in an acid medium we can heat to 60° C. or above until the pigments are liberated. In general, we prefer to operate at boiling temperature and at a pH of about 8.5 to 9.0 as this is a rapid and efficient procedure.

At a pH of less than 7.0, bile pigments tend to decompose although by operating so that the pigments as liberated are removed from the reaction zone, we obtain good yields and no substantial loss of product by breakdown reactions. We can avoid this breakdown, for example, when working on the acid side, by heating and agitating in the presence of a water-immiscible solvent for the bile pigments so that the said pigments are rapidly removed from the aqueous medium. The pigment may then be recovered from the solvent extract in any desired manner.

We prefer in general, however, to operate on the alkaline side. Bile pigments which are present in solutions that have a pH of more than 7.0 will be converted to their salts. This tends to drive the cleavage reaction to the right and, furthermore, tends to stabilize the pigments so that breakdown and loss of pigment are not problems.

An antioxidant, such as sodium sulfite, may be added to the aqueous phase during this treatment to prevent undesired oxidative changes. Very small amounts of such a compound are necessary, as low as 0.01% being effective.

When sources of bile pigment complex other than bile, such as gall stones or meconium are used, they are first taken up in an aqueous medium. For example, gallstones may be suitably dissolved in aqueous alkali. They may be dissolved with heating so that solution and cleavage proceed more or less simultaneously.

Example

As a specific example of the manner in which our invention operates, fifty gallons of hog bile are adjusted to a pH of 9.0 by the slow addition of 4% NaOH solution, with stirring. To this alkalinized bile are added 250 cc. of a 10% solution of sodium bisulfite and the whole is then boiled for forty-five minutes. At the end of this time the solution is acidified with acetic acid to a pH of 6.1, the temperature is allowed to fall to about 180° F. and there are added 50 gallons of chlorbenzene. The whole is then conveniently mixed and extraction effected by boiling for 30 minutes.

At the end of this time the temperature is allowed to decrease, whereupon the aqueous and chlorbenzene phases separate and the chlorbenzene layer is separated off.

This chlorbenzene extract contains the bile pigments and bilirubin is recovered therefrom, suitably by the process described in co-pending application Serial No. 338,434, filed June 1, 1940, now U. S. Patent 2,331,574 wherein the solvent extract is treated first with a weakly basic substance, such as sodium bicarbonate, to remove the strongly acidic impurities and then with a stronger base, such as sodium carbonate, to precipitate the bilirubin in the form of its salt. This salt is then separated off, dissolved in water or alcohol and acidified to precipitate free bilirubin. The precipitate is separated from the liquid and washed alternately with alcohol and water, and finally with ether. A yield of 30 grams of bilirubin is obtained.

It is not an essential feature of this invention that the bilirubin be recovered from a solvent extract as described above but the bile pigments liberated by the process of this invention may be recovered in other ways, as by fractional crystallization from solvent extracts or by precipitation as salts followed by purification of the said precipitated salts.

The bile pigments liberated as described above are present in the free state when the procedure is carried out at a pH of less than 7.0. They are converted to soluble salts at a pH of above 7.0, as also described in co-pending application Serial No. 338,433, filed June 1, 1940, now U. S. Patent 2,363,471 in which a process is described for cleavage of the natural complex by increasing the hydroxyl ions in solutions of said complexes. The liberated bile pigments combine with positive metallic ions present in the medium and the salts formed are treated with acid as described to again liberate the bile pigment. At a pH of more than 12.0, the heating time should be quite short, of the order of fifteen minutes, in order to prevent saponification of the bile acids which will lead to production of emulsions which are difficult to break. It is economical, furthermore, to operate at a pH of less than 12.0 since less acid will be required to neutralize the free alkali and to break down the salts which are formed.

The solvent used in the example shown for extracting the bile pigments from the aqueous medium in which they have been liberated may be any water-immiscible organic solvent suitable for the purpose, for example monochlorbenzene, chloroform, toluene, carbon disulfide, etc.

It will be understood that various modifications may be made in the procedure without departing from the scope of the invention.

Having now described our invention what we claim is:

1. A process for recovering bile pigment from a natural complex containing the same which comprises heating the said complex while in aqueous solution at a pH of less than 12.0, extracting the resulting solution at a pH of below 7.0 with a water-immiscible organic solvent capable of dissolving bile pigments, separating said solvent extract and recovering the bile pigments therefrom.

2. A process for recovering bile pigment from a natural complex containing the same which comprises heating the said complex in aqueous solution at a pH of from about 7.0 to 12.0 acidifying the resulting solution to a pH of less than 7.0, extracting the solution with a normally liquid chlorinated hydrocarbon solvent, separating off said solvent extract and recovering said bile pigment therefrom.

3. A process for recovering bile pigment from bile in aqueous solution at a pH of less than 12.0 which comprises boiling the bile, extracting the resulting solution at a pH of less than 7.0 with a water-immiscible organic solvent capable of dissolving bile pigment, separating the solvent extract and recovering bile pigment therefrom.

4. A process as in claim 3 wherein the bile pigment is bilirubin.

5. A process as in claim 3 wherein the solvent is a normally liquid chlorinated aromatic hydrocarbon.

6. A process for recovering bile pigments from bile which comprises boiling the bile at a pH of less than 7.0 with a water-immiscible organic solvent capable of dissolving bile pigment, then separating the solvent and recovering bile pigment therefrom.

7. In a process for recovering a bile pigment from a natural complex containing the same, the steps of boiling said complex in aqueous solution to liberate the pigment from said complex, and separating the freed pigment from the resulting aqueous material.

JULES D. PORSCHE.
FRED J. SOLMS.